(12) United States Patent
Bridgelall

(10) Patent No.: US 7,175,093 B2
(45) Date of Patent: Feb. 13, 2007

(54) RANGE EXTENSION FOR RFID HAND-HELD MOBILE COMPUTERS

(75) Inventor: Raj Bridgelall, Mount Sinai, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 177 days.

(21) Appl. No.: 10/021,843

(22) Filed: Dec. 13, 2001

(65) Prior Publication Data

US 2002/0170969 A1    Nov. 21, 2002

Related U.S. Application Data

(60) Provisional application No. 60/291,538, filed on May 16, 2001.

(51) Int. Cl.
*G06K 7/10* (2006.01)
(52) U.S. Cl. .................. 235/472.01; 235/486; 703/303
(58) Field of Classification Search ................ 235/451, 235/383, 385, 462.46, 472.02, 382, 380, 235/472.01, 462.45, 486; 703/303
See application file for complete search history.

(56) References Cited

U.S. PATENT DOCUMENTS

| | | | | |
|---|---|---|---|---|
| 5,280,159 A | * | 1/1994 | Schultz et al. .............. 235/382 |
| 5,331,580 A | * | 7/1994 | Miller et al. ................ 708/173 |
| 5,579,489 A | * | 11/1996 | Dornier et al. ............. 710/303 |
| 5,602,377 A | * | 2/1997 | Beller et al. ................ 235/385 |
| 5,640,002 A | * | 6/1997 | Ruppert et al. ............. 235/383 |
| 6,264,106 B1 | | 7/2001 | Bridgelall |
| 6,286,762 B1 | * | 9/2001 | Reynolds et al. ...... 235/472.01 |
| 6,294,997 B1 | * | 9/2001 | Paratore et al. ............ 235/385 |
| 6,318,631 B1 | | 11/2001 | Halperin |
| 6,512,919 B2 | * | 1/2003 | Ogasawara ................ 235/385 |
| 6,517,000 B1 | * | 2/2003 | McAllister et al. ..... 235/472.01 |
| 6,539,422 B1 | * | 3/2003 | Hunt et al. ................. 709/217 |
| 6,661,433 B1 | * | 12/2003 | Lee ............................ 235/383 |
| 6,830,181 B1 | * | 12/2004 | Bennett ................. 235/462.46 |
| 6,877,658 B2 | * | 4/2005 | Raistrick et al. ....... 235/462.01 |

FOREIGN PATENT DOCUMENTS

WO    WO 01 94967 A    12/2001

* cited by examiner

*Primary Examiner*—Uyen-Chau N. Le
(74) *Attorney, Agent, or Firm*—Ingrassia Fisher & Lorenz, P.C.

(57) ABSTRACT

A mobile computer and a reader are provided that may be constructed as a standard modular attachment (e.g. sled) for the computer that may be used only when RFID interrogation is desired. The sled may carry an antenna loop, integrated RFID reader electronics, and a dedicated battery that are separate from the actual mobile computer.

15 Claims, 4 Drawing Sheets

RANGE EXTENSION FOR RFID HAND-HELD MOBILE COMPUTERS

REFERENCE TO RELATED APPLICATIONS

This application claims the benefit of the U.S. provisional application Ser. No. 60/291,538, filed May 16, 2001, which is incorporated herein by reference in its entirety.

BACKGROUND OF THE INVENTION

Radio Frequency Identification (RFID) has become an important implementation of an Automatic Identification technique. The object of any RFID system is to carry data suitable transponders, generally known as tags, and to retrieve data, by machine-readable means, at a suitable time and place to satisfy particular application needs. Data within a tag may provide identification for an item in manufacture, goods in transit, a location, the identity of a vehicle, an animal or individual. By including additional data the prospect is provided for supporting applications through item specific information or instructions immediately available on reading the tag. For example, the color of paint for a car body entering a paint spray area on the production line, the set-up instructions for a flexible manufacturing cell or the manifest to accompany a shipment of goods.

RFID technologies vary widely in frequency, packaging, performance, and cost. There are many established applications. A system requires, in addition to tags, a means of reading or interrogating the tags and some means of communicating the data to a host computer or information management system. A system will also include a facility for entering or programming data into the tags, if this is not undertaken at source by the manufacturer.

Communication of data between tags and a reader is by wireless communication. Two methods distinguish and categorize RFID systems, one based upon close proximity electromagnetic or inductive coupling and one based upon propagating electromagnetic waves. Coupling is via 'antenna' structures forming an integral feature in both tags and readers. While the term antenna is generally considered more appropriate for propagating systems it is also loosely applied to inductive systems.

Transmitting data is subject to the influences of the media or channels through which the data has to pass, including the air interface. Noise, interference and distortion are the sources of data corruption that arise in practical communication channels that must be guarded against in seeking to achieve error free data recovery. Moreover, the nature of the data communication processes, being asynchronous in nature, requires attention to the form in which the data is communicated. Structuring the bit stream to accommodate these needs is often referred to as channel encoding and although transparent to the user of an RFID system the coding scheme applied appears in system specifications. Various encoding schemes can be distinguished, each exhibiting different performance features.

To transfer data efficiently via the air interface or space that separates the two communicating components requires the data to be superimposed upon a rhythmically varying (sinusoidal) field or carrier wave. This process of superimposition is referred to as modulation, and various schemes are available for this purposes, each having particular attributes that favor their use. They are essentially based upon changing the value of one of the primary features of an alternating sinusoidal source, its amplitude, frequency or phase in accordance with the data carrying bit stream. On this basis one can distinguish amplitude shift keying (ASK), frequency shift keying (FSK) and phase shift keying (PSK). Based on these limitations, the operational distance for inductively coupled RFID tags such as those operating at 125 kHz and 13.56 MHz cannot be greater than approximately 5 inches when the reader and antenna are fully integrated into a small hand-held mobile computer.

Nevertheless, many applications require hand-held readers that will be capable of interrogating RFID tags at distances beyond 12 inches. The operational distance for inductively coupled RFID tags such those operating at 125 kHz and 13.56 MHz are directly proportional to the antenna (coil) size. For example, a typical design will generally provide interrogation distances between 35% to 200% of the antenna loop diameter. Therefore, in order to obtain 12 inches of read range on a typical credit card size RFID tag, the antenna can be approximately six inches in diameter at best. Integrating such a large antenna will grow the size of the hand-held mobile computer to a point where it is no longer practical for use over an extended period of time.

Even if such a large antenna were integrated, it must be maximally separated from the metallic parts within the mobile computer so as to avoid magnetic field dampening. Examples of metallic parts are scan engine opto-mechanical chassis, mounting brackets, electronic packaging, flex connectors, electromagnetic shielding, etc. In addition, a large battery will be necessary in order to sustain an adequately large current in the RFID antenna that will generate the required magnetic field strength for interrogating tags out to the desired distances.

The three key requirements of maximally large antenna, clearance from metallic components, and high current generating capability over the operational life of the device make it impractical under current design restraints to construct a small and ergonomically correct mobile computer.

There is, therefore, a need in the art for an apparatus, method, and system that will enable a hand held mobile computer to use RFID for distances from beyond about 12 inches while still maintaining its ergonomic correctness.

SUMMARY OF THE INVENTION

The present invention provides for a mobile computer and a reader that may be constructed as a standard modular attachment (e.g. sled) for the computer that may be used only when RFID interrogation is desired. The sled may carry an antenna loop, integrated RFID reader electronics, and a dedicated battery that are separate from the actual mobile computer.

BRIEF DESCRIPTION OF THE DRAWINGS

The accompanying drawings, which are incorporated in and constitute a part of this specification, illustrate one embodiment of the invention and together with the description serve to explain the principals of the invention.

DETAILED DESCRIPTION

Figure 1:
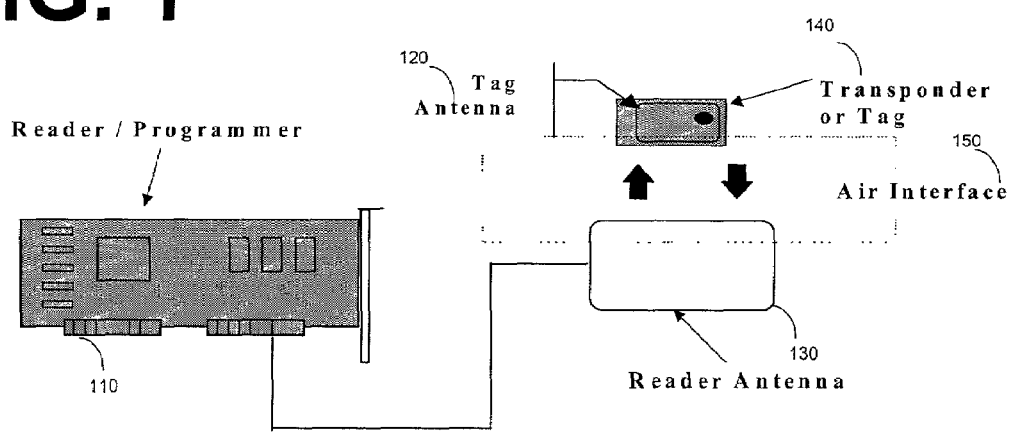
FIG. 1 illustrates a block diagram of a typical RFID system.

Turning to FIG. 1, shown are the typical components of an RFID system, including a reader/programmer access card 110 that interfaces with a host computer or other device (not shown) and a reader antenna 130. Using power provided by the reader/programmer 110, the reader/antenna transmits signals through the air interface 150. The transponder or tag 140 contains a tag antenna 120 which, via the air interface 150, communicates with the reader antenna 130.

The tag 140 responds to a transmitted or communicated request for the data it carries, the mode of communication between the reader and the tag being by wireless means across the space or air interface 150 between the two. Tags 140 may be fabricated as low power integrated circuits suitable for interfacing to external coils, or utilizing "coil-on-chip" technology, for data transfer and power generation (passive mode). The tag 140 memory may comprise read-only (ROM), random access (RAM) and non-volatile programmable memory for data storage depending upon the type and sophistication of the device. The ROM-based memory is used to accommodate security data and the transponder operating system instructions which, in conjunction with the processor or processing logic deals with the internal "house-keeping" functions such as response delay timing, data flow control and power supply switching. The RAM-based memory is used to facilitate temporary data storage during transponder interrogation and response. The non-volatile programmable memory may take various forms, electrically erasable programmable read only memory (EEPROM) being typical. It is used to store the transponder data and needs to be non-volatile to ensure that the data is retained when the device is in its quiescent or power-saving "sleep" state.

Data buffers are further components of memory, used to temporarily hold incoming data following demodulation and outgoing data for modulation and interface with the transponder antenna. The interface circuitry provides the facility to direct and accommodate the interrogation field energy for powering purposes in passive transponders and triggering of the transponder response. Where programming is accommodated facilities must be provided to accept the data modulated signal and perform the necessary demodulation and data transfer processes.

For tags 140 to work they require power, even though the levels are invariably very small (micro to milliwatts). Tags 140 are either passive or active, the designation being determined entirely by the manner in which the device derives its power. Active tags are powered by an internal battery and are typically read/write devices. They usually contain a cell that exhibits a high power-to-weight ratio and are usually capable of operating over a temperature range of −50° C. to +70° C. The use of a battery means that a sealed active transponder has a finite lifetime. However, a suitable cell coupled to suitable low power circuitry can ensure functionality for as long as ten or more years, depending upon the operating temperatures, read/write cycles and usage. The trade-off is greater size and greater cost compared with passive tags. In general terms, active transponders allow greater communication range than can be expected for passive devices, better noise immunity and higher data transmissions rates when used to power a higher frequency response mode.

Passive tags operate without an internal battery source, deriving the power to operate from the field generated by the reader. Passive tags are consequently much lighter than active tags, less expensive, and offer a virtually unlimited operational lifetime. The trade-off is that they have shorter read ranges than active tags and require a higher-powered reader. Passive tags are also constrained in their capacity to store data and the ability to perform well in noisy radio environments. Sensitivity and orientation performance may also be constrained by the limitation on available power. Despite these limitations passive transponders offer advantages in terms of cost and longevity. They have an almost indefinite lifetime and are generally lower on price than active transponders.

Data stored in data carriers invariable require some organization and additions, such as data identifiers and error detection bits, to satisfy recovery needs. This process is often referred to as source encoding. Standard numbering systems, such as UCC/EAN and associated data defining elements may also be applied to data stored in tags. The amount of data will of course depend on application and require an appropriate tag to meet the need Identifiers, in which a numeric or alphanumeric string is stored for identification purposes or as an access key to data stored elsewhere in a computer or information management system, or portable data files, in which information can be organized, for communication or as a means of initiating actions without recourse to, or in combination with, data stored elsewhere.

In terms of data capacity tags 140 can be obtained that satisfy needs from single bit to kilobits. The single bit devices are essentially for surveillance purposes. Retail electronic article surveillance (EAS) is the typical application for such devices, being used to activate an alarm when detected in the interrogating field. They may also be used in counting applications. Devices characterized by data storage capacities up to 128 bits are sufficient to hold a serial or identification number together, possibly, with parity check bits. Such devices may be manufacturer or user programmable. Tags 140 with data storage capacities up to 512 bits, are invariably user programmable, and suitable for accommodating identification and other specific data such as serial numbers, package content, key process instructions or possibly results of earlier interrogation/response transactions.

Tags 140 characterized by data storage capacities of around 64 kilobits may be regarded as carriers for portable data files. With increased capacity the facility can also be provided for organizing data into fields or pages that may be selectively interrogated during the reading process. Depending upon the type of memory a tag 140 contains the data carried may be read-only, write once read many (WORM) or read/write. Read-only tags are invariably low capacity devices programmed at source, usually with an identification number. WORM devices are user programmable devices. Read/write devices are also user-programmable but allowing the user to change data stored in a tag. Portable programmers may be recognized that also allow in-field programming of the tag while attached to the item being identified or accompanied.

The tag antenna 120 is the means by which the device senses the interrogating field and, where appropriate, the programming field and also serves as the means of transmitting the transponder response to interrogation The reader antenna 130 can differ quite considerably in complexity, depending upon the type of tags 140 being supported and the functions to be fulfilled. However, the overall function is to provide the means of communicating with the tags and facilitating data transfer. Functions performed by the reader may include quite sophisticated signal conditioning, parity error checking and correction. Once the signal from a transponder has been correctly received and decoded, algorithms may be applied to decide whether the signal is a repeat transmission, and may then instruct the transponder to cease transmitting. This is known as the "Command Response Protocol" and is used to circumvent the problem of reading multiple tags in a short space of time. Using interrogators in this way is sometimes referred to as "Hands Down Polling". An alternative, more secure, but slower tag polling technique is called "Hands Up Polling" which involves the interrogator looking for tags with specific identities, and interrogating them in turn. This is contention management, and a variety of techniques have been developed to improve the process of batch reading. A further approach may use multiple readers, multiplexed into one interrogator, but with attendant increases in costs.

Transponder programmers are the means by which data is delivered to write once, read many (WORM) and read/write tags. Programming is generally carried out off-line, at the beginning of a batch production run, for example.

For some systems re-programming may be carried out on-line, particularly if it is being used as an interactive portable data file within a production environment, for example. Data may need to be recorded during each process. Removing the transponder at the end of each process to read the previous process data, and to program the new data, would naturally increase process time and would detract substantially from the intended flexibility of the application. By combining the functions of a reader/interrogator and a programmer, data may be appended or altered in the transponder as required, without compromising the production line.

The range over which the programming can be achieved is generally less than the read range and in some systems near contact positioning is required. Programmers are also generally designed to handle a single tag at a time. However, developments are now satisfying the need for selective programming of a number of tags present within the range of the programmer.

RFID systems as shown in FIG. 1 may be roughly grouped into four categories: AS (Electronic Article Surveillance) systems, Portable Data Capture systems, Networked systems, and Positioning systems. Electronic Article Surveillance systems are typically a one bit system used to sense the presence/absence of an item. The large use for this technology is in retail stores where each item is tagged and a large antenna readers are placed at each exit of the store to detect unauthorized removal of the item (theft). Portable data capture systems are characterized by the use of portable data mobile computers with integral RFID readers and are used in applications where a high degree of variability in sourcing required data from tagged items may be exhibited. The hand-held readers/portable data mobile computers capture data which is then either transmitted directly to a host information management system via a radio frequency data communication (RFDC) link or held for delivery by line-linkage to the host on a batch processing basis. Networked systems applications can generally be characterized by fixed position readers deployed within a given site and connected directly to a networked information management system. The transponders are positioned on moving or moveable items, or people, depending upon application. Positioning systems use transponders to facilitate automated location and navigation support for guided vehicles. Readers are positioned on the vehicles and linked to an on-board computer and RFDC link to the host information management system. The transponders are embedded in the floor of the operating environment and programmed with appropriate identification and location data. The reader antenna is usually located beneath the vehicle to allow closer proximity to the embedded transponders.

Figure 2A:
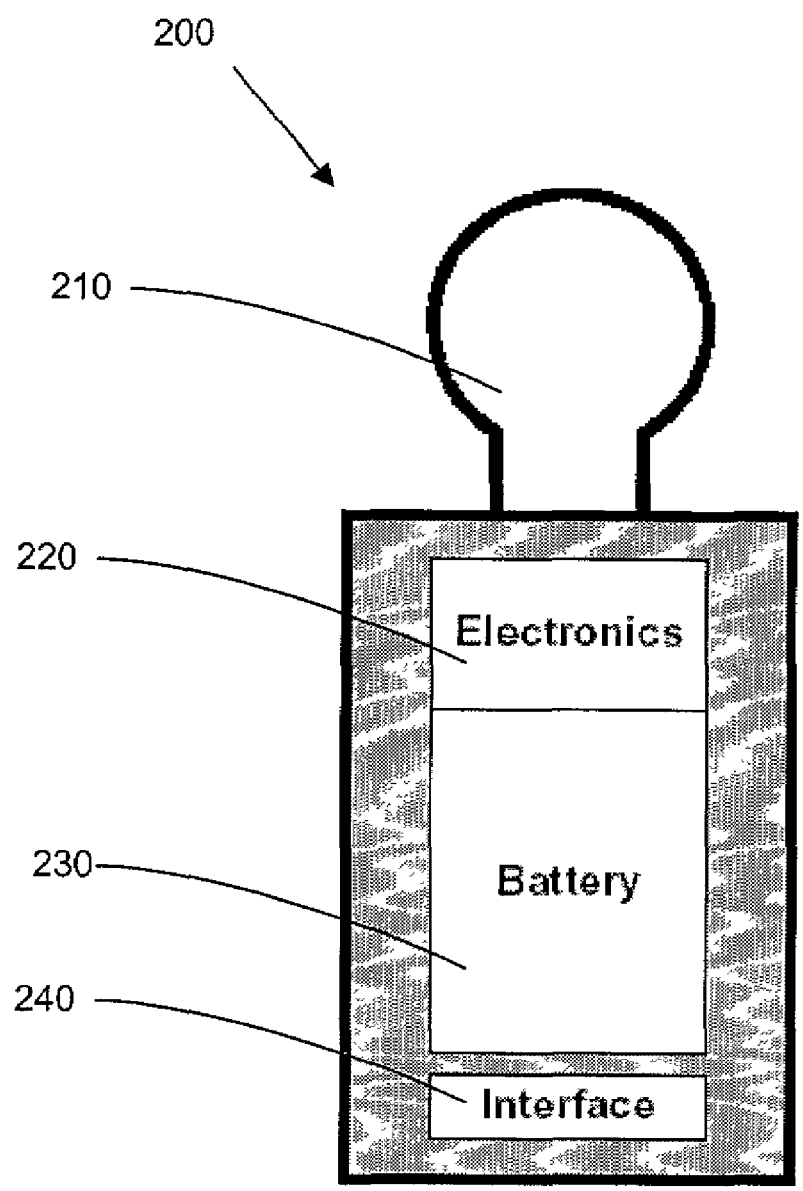
FIG. 2A illustrates an interior view of a RFID sled coupled with a handheld computer which is an embodiment of the present invention.
Figure 2B:
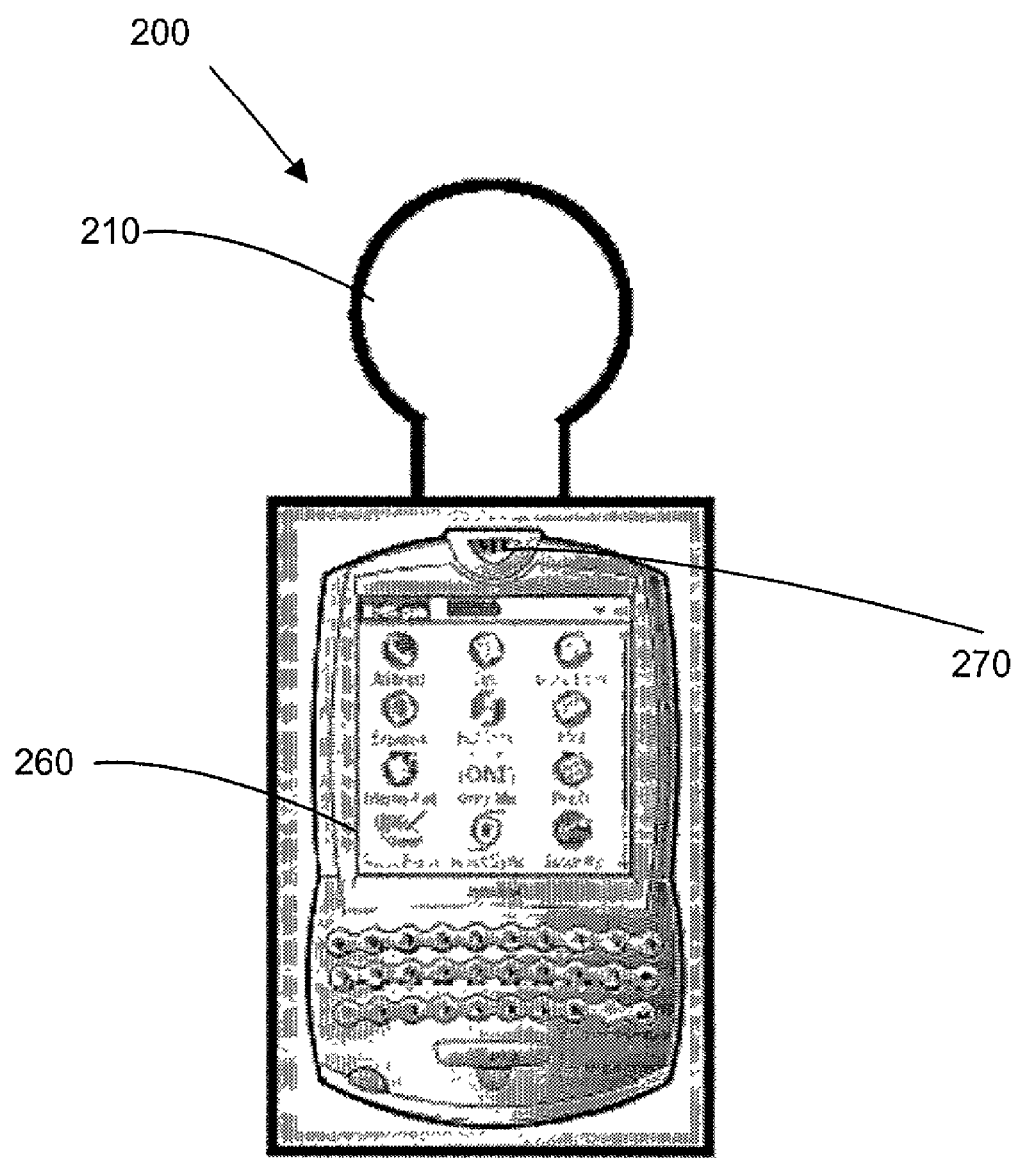
FIG. 2B illustrates an exterior view of a RFID sled coupled with a handheld computer which is an embodiment of the present invention.

As the typical hand-held mobile computer is not used exclusively for RFID interrogation, the present invention does not call for a mobile computer with a large integrated RFID reader. Instead, the reader can be constructed as a standard modular attachment (e.g. sled) for the mobile computer and it may be used only when RFID interrogation is desired. FIG. 2A shows an embodiment of the present invention whereby the sled 200 carries an antenna loop 210, integrated RFID reader electronics 220, a dedicated battery 230, and an interface 240 to associate with the mobile computer. These will all be separate from the actual hand-held mobile computer. FIG. 2B shows an exterior view of the mobile computer 260 accompanied by the sled 200, with the antenna loop 210 visible.

The mobile computer 260 may also include an integrated bar code scanner 270. As Within this scanner, a light source, such as a laser, generates a light beam which is directed by optical components along a light path toward a bar code symbol. The laser light beam is repetitively scanned by a scanning component, such as an oscillating mirror situated in the beam path, to sweep a beam spot beam across the bar code symbol. A photodetector detects light of variable intensity reflected or scattered from the symbol and generates electrical signals indicative of the detected light. These electrical signals are decoded and into data representative of the data encoded in the symbol. The integrated bar code scanner 270 may also be located on the sled 200.

Data gathered by the mobile computer 260 may be stored and transmitted at a later point to other parts of a network (batch mode) or transferred to the network soon after acquisition using a pre-installed wireless network. The assignee of the present invention supplies a wireless data communications systems known as the Spectrum 24® System, which follows the communications protocol of IEEE Standard 802.11. In the system as implemented, mobile units are in data communication with a central computer through access points. The access points communicate with the computer over an Ethernet wired network. The transmission data and the reception data may use a TCP/IP protocol, and the wired network may also be connected to the Internet. Each of the mobile units associates itself with one of the access points. In order to maintain order and reduce radio communications each access point must determine which of the communications received over the Ethernet link from the central computer is destined for a mobile unit associated with that particular access point.

Figure 3:
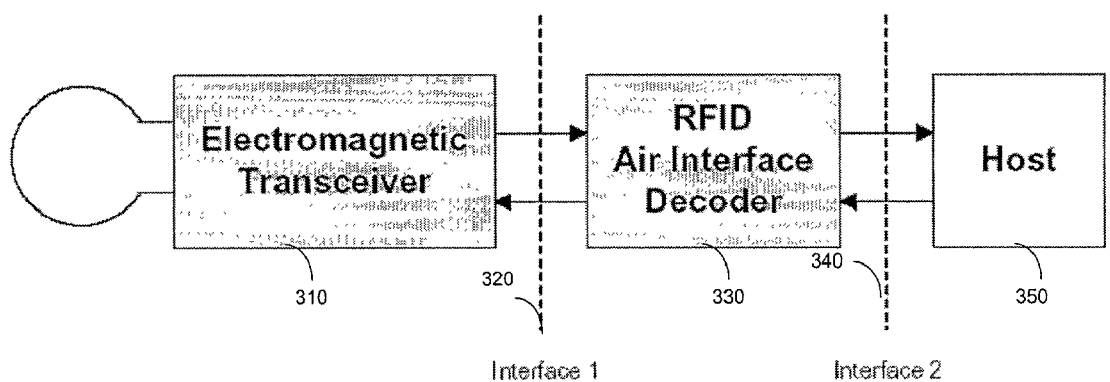
FIG. 3 illustrates a system-level view of an RFID sled coupled with a handheld computer which is an embodiment of the present invention.

The electronics of the sled may be partitioned in one of several ways as shown in FIG. 3. The electromagnetic transceiver 310 will produce signals that are compatible with the standard interface of the sled at "interface 1" 320. The RFID air interface decoder 330 must, therefore, be accommodated within the mobile computer 260 itself. Alternatively, the RFID decoding can be done within the sled 200 and only the decoded data will be transmitted to the mobile computer (host) 350 using the standard interface 340 (interface 2) of the sled.

The advantage of the first approach is that the RFID decoding can take advantage of the powerful microcontroller/microprocessor of the mobile computer. A second advantage is that this approach allows for a second but reduced performance RFID electromagnetic transceiver that can be integrated within the mobile computer itself. Both transceivers will have an identical decoder. A third advantage of this approach is that it is more cost effective when the reduced performance but integrated RFID reader is also desirable.

The advantage of the second approach is that the entire RFID functionality is separate and modular whereby the mobile computer need not support RFID decoding logic or software. A second advantage of the second approach is that any host interface can be easily accommodated via the RFID decoder microelectronics, without the need to add specialized logic to handle a particular host interface.

It is to be understood that both the foregoing description are exemplary and explanatory only and are not restrictive of the invention, as claimed.

I claim:

1. A Radio Frequency IDentification (RFID) extension for a mobile computer lacking RFID functionality, comprising:
   a standard modular attachment suitable for holding the mobile computer;
   a battery carried by said standard modular attachment;
   circuitry carried by said standard modular attachment and coupled to said battery for providing the RFID functionality, said circuitry including an electromagnetic transceiver and a RFID air interface decoder; and
   modular attachment interface connected to said standard modular attachment for selectively coupling the mobile computer to said circuitry such that the mobile computer has access to the RFID functionality provided by said circuitry when the mobile computer is coupled to said modular attachment interface and is being held by said standard modular attachment, wherein said battery and said circuitry are separate from the mobile computer when the mobile computer is not being held by the standard modular attachment.

2. The RFID extension for the mobile computer lacking RFID functionality as in claim 1, further comprising a bar code scanner coupled to said modular attachment interface such that the mobile computer has access to data encoded in a bar code symbol scanned by said bar code scanner when the mobile computer is coupled to said modular attachment interface.

3. The RFID extension for the mobile computer lacking RFID functionality as in claim 1, further conprising an antenna loop connected to said standard modular attachment.

4. The RFID extension for the mobile computer lacking RFID functionality as in claim 3, wherein said standard modular attachment is a sled device.

5. A system, comprising:
   a mobile computer lacking radio frequency identification (RFID) functionality and comprising a first modular attachment interface; and
   a RFID extension for said mobile computer for selectively providing the RFID functionality to said mobile computer, said RFID extension comprising:
     a standard modular attachment suitable for holding said mobile computer;
     circuitry within said standard modular attachment configured to provide the RFID functionality, said circuitry including an electromagnetic transceiver and a RFID air interface decoder; and
     a second modular attachment interface connected to said standard modular attachment for selectively coupling to said first modular attachment interface such that said mobile computer has access to the RFID functionality provided by said circuitry when said second modular attachment interface is coupled to said first modular attachment interface and said mobile computer is being held by said standard modular attachment, wherein said circuitry is separate from said mobile computer when said mobile computer is not be held by said standard modular attachment.

6. The system as in claim 5, wherein said RFID extension further comprises:
   a bar code scanner coupled to said second modular attachment interface such that said mobile computer has access to data encoded in a bar code symbol scanned by said bar code scanner when said second modular attachment interface is coupled to said first modular attachment interface.

7. The system as in claim 5, further comprising an antenna loop connected to said standard modular attachment.

8. The system as in claim 7, wherein said standard modular attachment is a sled device.

9. The system as in claim 7, further comprising a RFID tag that can be scanned by said RFID extension when said RFID extension and said RFID tag are separated by a distance greater than about twelve (12) inches.

10. A system, comprising:
    a mobile computer lacking radio frequency identification (RFID) functionality and comprising a first modular attachment interface and a radio module;
    a RFID extension for said mobile computer for selectively providing the RFID functionality for said mobile computer, said RFID extension comprising:
      a standard modular attachment suitable for holding said mobile computer;
      circuitry within said standard modular attachment for providing the RFID functionality, said circuitry including an electromagnetic transceiver and a RFID air interface decoder; and
      a second modular attachment interface connected to said standard modular attachment for coupling to said first modular attachment interface such that said mobile computer has access to the RFID functionality provided by said circuitry when said second modular attachment interface is coupled to said first modular attachment interface and said mobile computer is being held by said standard modular attachment, wherein said circuitry is separate from said mobile computer when said mobile computer is not being held by said standard modular attachment;
    a wired network and
    an access point, for transmitting transmission data from said wired network to said mobile computers via a wireless medium and receiving reception data from said mobile computers to said wired network via said wireless medium and also for forming a transmission area that includes a space where association to said access point is possible by said mobile computer.

11. The system as in claim 10, wherein the transmission data and the reception data use a TCP/IP protocol, and wherein the wired network is connected to the internet.

12. The system as in claim 10, wherein the RFID extension further comprises:
    a bar code scanner coupled to said modular attachment interface such that the mobile computer has access to data encoded in a bar code symbol scanned by said bar code scanner when the first modular attachment interface is coupled to said second modular attachment interface.

13. The system as in claim 10, further comprising an antenna loop connected to said standard modular attachment.

14. The system as in claim 13, wherein said modular attachment is a sled device.

15. The system as in claim 14, further a RFID tag that can be scanned by said RFID extension when said RFID extension and said RFID tag are separated by a distance greater than about twelve (12) inches.

* * * * *

UNITED STATES PATENT AND TRADEMARK OFFICE
CERTIFICATE OF CORRECTION

| | |
|---|---|
| PATENT NO. | : 7,175,093 B2 |
| APPLICATION NO. | : 10/021843 |
| DATED | : February 13, 2007 |
| INVENTOR(S) | : Raj Bridgelall |

It is certified that error appears in the above-identified patent and that said Letters Patent is hereby corrected as shown below:

In Claim 3, column 7, line 41, delete the word "conprising" and insert the word --comprising--.

In Claim 5, column 8, line 3, delete the word "be" and insert the word --being--.

Signed and Sealed this

Fifteenth Day of May, 2007

JON W. DUDAS
*Director of the United States Patent and Trademark Office*